US012783777B2

(12) United States Patent
Wolpert et al.

(10) Patent No.: US 12,783,777 B2
(45) Date of Patent: Nov. 3, 2026

(54) RETARGETING-AWARE FILL

(71) Applicant: International Business Machines Corporation, Armonk, NY (US)

(72) Inventors: David Wolpert, Poughkeepsie, NY (US); Matthew T. Guzowski, Essex Junction, VT (US); Alexander Joel Suess, Hopewell Junction, NY (US); Robert John Allen, Jericho, VT (US); Joseph Koone, Poukeepsie, NY (US); Smitha Reddy, Fishkill, NY (US); Margaret Annabelle Allen, Jericho, VT (US)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 519 days.

(21) Appl. No.: 18/422,917

(22) Filed: Jan. 25, 2024

(65) Prior Publication Data

US 2025/0245409 A1 Jul. 31, 2025

(51) Int. Cl.
*G06F 30/392* (2020.01)
*G06F 30/20* (2020.01)
(Continued)

(52) U.S. Cl.
CPC ............ *G06F 30/392* (2020.01); *G06F 30/20* (2020.01); *G06F 30/3308* (2020.01);
(Continued)

(58) Field of Classification Search
CPC .... G06F 30/392; G06F 30/394; G06F 30/398; G06F 30/367; G06F 30/3308; G06F 30/20; G06F 2119/02; G06F 2119/12
(Continued)

(56) References Cited

U.S. PATENT DOCUMENTS 7,694,261 B1 * 4/2010 Chyan .................. G06F 30/394 716/126
8,161,425 B1 4/2012 Noice et al.
(Continued)

FOREIGN PATENT DOCUMENTS

WO 2018234747 A1 12/2018

OTHER PUBLICATIONS

Charre, Luis, et al. “Timing aware dummy metal fill methodology.” arXiv preprint arXiv:1711.01407 (2017).
(Continued)

*Primary Examiner* — Phallaka Kik
(74) *Attorney, Agent, or Firm* — Kristofer Haggerty, Esq.; Kevin P. Radigan, Esq.; Heslin Rothenberg Farley & Mesiti P.C.

(57) ABSTRACT

Embodiments of the present disclosure provide methods, systems, and computer program products for implementing retargeting-aware metal fill optimization for an IC layout. A disclosed embodiment enables a metal fill optimization design tool to identify empty space adjacent to the active metal shapes of one or more signal path nets in a metal shapes infrastructure and provide retargeting-aware metal fill insertion into empty space configured to specifically avoid foundry retargeting operations having adverse impacts on timing characteristics of signal path nets.

20 Claims, 6 Drawing Sheets

(51) Int. Cl.

| | |
|---|---|
| ***G06F 30/3308*** | (2020.01) |
| ***G06F 30/367*** | (2020.01) |
| ***G06F 30/394*** | (2020.01) |
| ***G06F 30/398*** | (2020.01) |
| *G06F 119/02* | (2020.01) |
| *G06F 119/12* | (2020.01) |

(52) U.S. Cl.
CPC .......... *G06F 30/367* (2020.01); *G06F 30/394* (2020.01); *G06F 30/398* (2020.01); *G06F 2119/02* (2020.01); *G06F 2119/12* (2020.01)

(58) Field of Classification Search
USPC ........ 716/119, 126, 111, 113, 106, 134, 136; 703/16, 17, 19
See application file for complete search history.

(56) References Cited

U.S. PATENT DOCUMENTS

| | | | | |
|---|---|---|---|---|
| 8,312,394 | B2 | 11/2012 | Ban et al. | |
| 8,372,742 | B2 | 2/2013 | Cheng et al. | |
| 8,397,196 | B2 * | 3/2013 | Tetelbaum | G06F 30/39 716/112 |
| 8,640,076 | B2 * | 1/2014 | Mina | G06F 30/39 716/136 |
| 8,719,746 | B1 * | 5/2014 | Davidovic | G06F 30/398 716/135 |
| 9,064,086 | B2 | 6/2015 | Sun et al. | |
| 9,552,453 | B1 | 1/2017 | Agarwal et al. | |
| 10,192,021 | B1 * | 1/2019 | Raj | G06F 30/398 |
| 10,678,988 | B2 | 6/2020 | Correale, Jr. et al. | |
| 10,691,858 | B1 * | 6/2020 | Balsdon | G06F 30/39 |
| 10,943,051 | B1 * | 3/2021 | Surprise | G06F 30/33 |
| 11,586,796 | B1 * | 2/2023 | Yadav | G06F 30/392 |
| 2008/0148212 | A1 * | 6/2008 | Vuong | G06F 30/39 716/135 |
| 2010/0242008 | A1 * | 9/2010 | Liu | G06F 30/392 716/108 |
| 2012/0096419 | A1 * | 4/2012 | Mina | G06F 30/39 716/106 |
| 2012/0284679 | A1 * | 11/2012 | Tetelbaum | G06F 30/39 716/113 |
| 2014/0059509 | A1 * | 2/2014 | Mina | G06F 30/39 716/129 |
| 2015/0149969 | A1 * | 5/2015 | Wang | G06F 30/39 716/52 |
| 2019/0384885 | A1 * | 12/2019 | Lau | G06F 30/398 |
| 2021/0240899 | A1 | 8/2021 | Shao et al. | |
| 2025/0245413 | A1 * | 7/2025 | Wolpert | G06F 30/398 |
| 2026/0023914 | A1 * | 1/2026 | Cavitt | G06F 30/398 |

OTHER PUBLICATIONS

U.S. Appl. No. 17/584,605 for titled “Adaptive Fill Techniques for Avoiding Electromigration,”filed Jan. 26, 2022.
Authors et al., “Method for Reducing the Impact of Metal Fill of the Timing of Critical Nets,” IP.com, IP.com No. IPCOM000270519D, Dated: Jul. 13, 2022, pp. 1-4.

* cited by examiner

RETARGETING-AWARE FILL

BACKGROUND

The present invention relates to integrated circuit design, and more specifically, to implementing retargeting-aware metal fill optimization in an integrated circuit (i.e., IC or chip) design layout for fabrication.

An IC or chip includes active devices or logic shapes forming electrical circuits, with metal wiring structures including active wire shapes connecting the active devices together. The active wire shapes form wiring metallization including multiple metal layers (e.g., 12 to 18 metal layers in a stack) in a back-end-of-line (BEOL) processing region of the chip, that form power and signal path nets connecting the different circuit logic together. Metal density fill includes metal fill shapes that are distinct from the main power and signal path design shapes, that are added to the wiring metallization of an IC design, (e.g., beyond active power and signal wiring shapes used for circuit logic) to satisfy metal density rules or patterning requirements for chip fabrication.

Retargeting operations are performed by a foundry or fabrication facility after delivery of a final physical design for an IC design. The retargeting operations change an IC layout received for fabrication to compensate for fabrication process challenges in the IC design layout. A foundry typically performs retargeting operations to create larger active wires (i.e., signal path nets) by forming larger active metal shapes that extend into open space adjacent to the active wires, also called white space. For example, retargeting operations include an increase in wire width for a given signal path wire or net by a defined factor established by the foundry that is based on the available empty space between a wire edge and a neighboring wire edge. Some retargeting operations reduce wire resistance, but can cause additional capacitance (e.g., planar and/or capacitance), that can adversely affect signal path timing characteristics of the signal nets connecting logic shapes, resulting in performance issues for the chip. New techniques are needed for implementing retargeting-aware metal density fill optimization in an IC design layout, which can pre-empt some retargeting operations by the foundry causing adverse timing issues, by purposefully inserting metal fill into gaps that could otherwise be used for foundry retargeting operations.

SUMMARY

Embodiments of the present disclosure provide methods, systems, and computer program products for implementing retargeting-aware metal fill optimization for an IC layout to enable effective overall chip performance According to one embodiment of the present disclosure, a non-limiting computer implemented method is provided. The method comprises accessing an IC layout comprising physical design data, the physical design data comprising active metal shapes of a metal shapes infrastructure forming signal path nets connecting active devices; performing shape-based checking of the physical design data, based on the active metal shapes to identify, one or more areas of open space adjacent to the active metal shapes of one or more signal path nets; and assigning retargeting-aware metal fill shapes to the metal shapes infrastructure of the IC layout, based on the one or more areas of open space adjacent to the active metal shapes.

Other disclosed embodiments include a computer system and computer program product for implementing retargeting-aware metal fill optimization for an IC layout, implementing features of the above-disclosed method.

DETAILED DESCRIPTION

Figure 1:
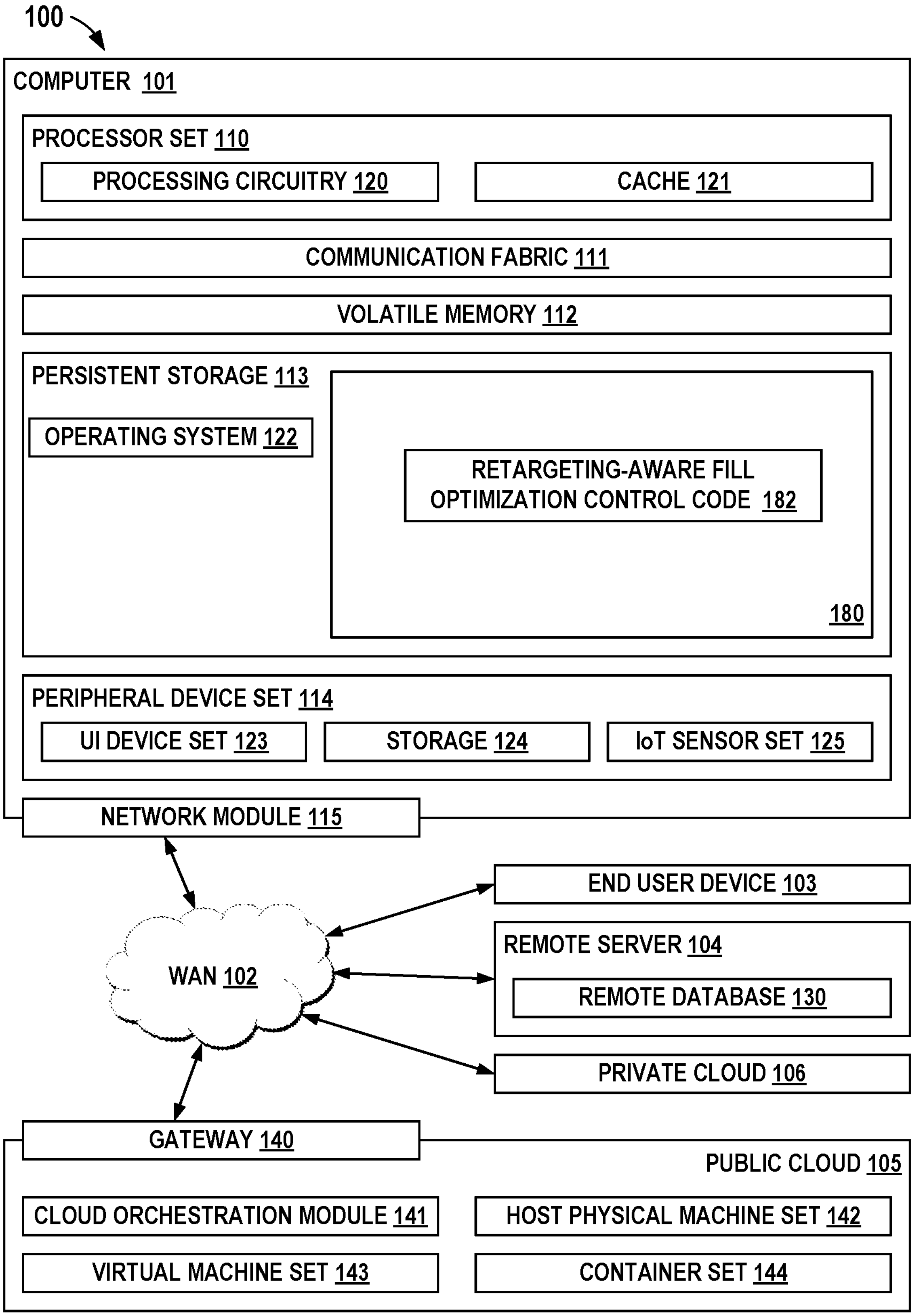
FIG. 1 is a block diagram of an example computer environment for use in conjunction with one or more disclosed embodiments.

Embodiments herein describe techniques for implementing retargeting-aware metal fill optimization for an IC layout to avoid adverse signal impact from foundry retargeting operations and achieving effective timing performance in an IC design using computer software tools. Retargeting operations by the foundry change an IC design layout received for fabrication in an attempt to compensate for fabrication process challenges in the IC design layout. For example, foundry retargeting operations can create larger wires that are easier to print, by extending active wires or signal path nets into available open space adjacent to the active wires, also called white space. However, such larger wires can adversely affect timing characteristics of the signal path nets resulting from increased planar and/or vertical capacitance between the larger wires and nearby wires on the same layer of metal or other layers of metal. Novel techniques are disclosed for implementing retargeting-aware metal fill insertion to prevent foundry retargeting operations that would adversely affect timing characteristics of signal path nets resulting from the larger wires. Novel disclosed techniques optimize insertion of metal fill shapes to eliminate empty space that otherwise could be used for foundry retargeting operations resulting in performance issues for the chip.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Retargeting-Aware Fill Optimization Control Code 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
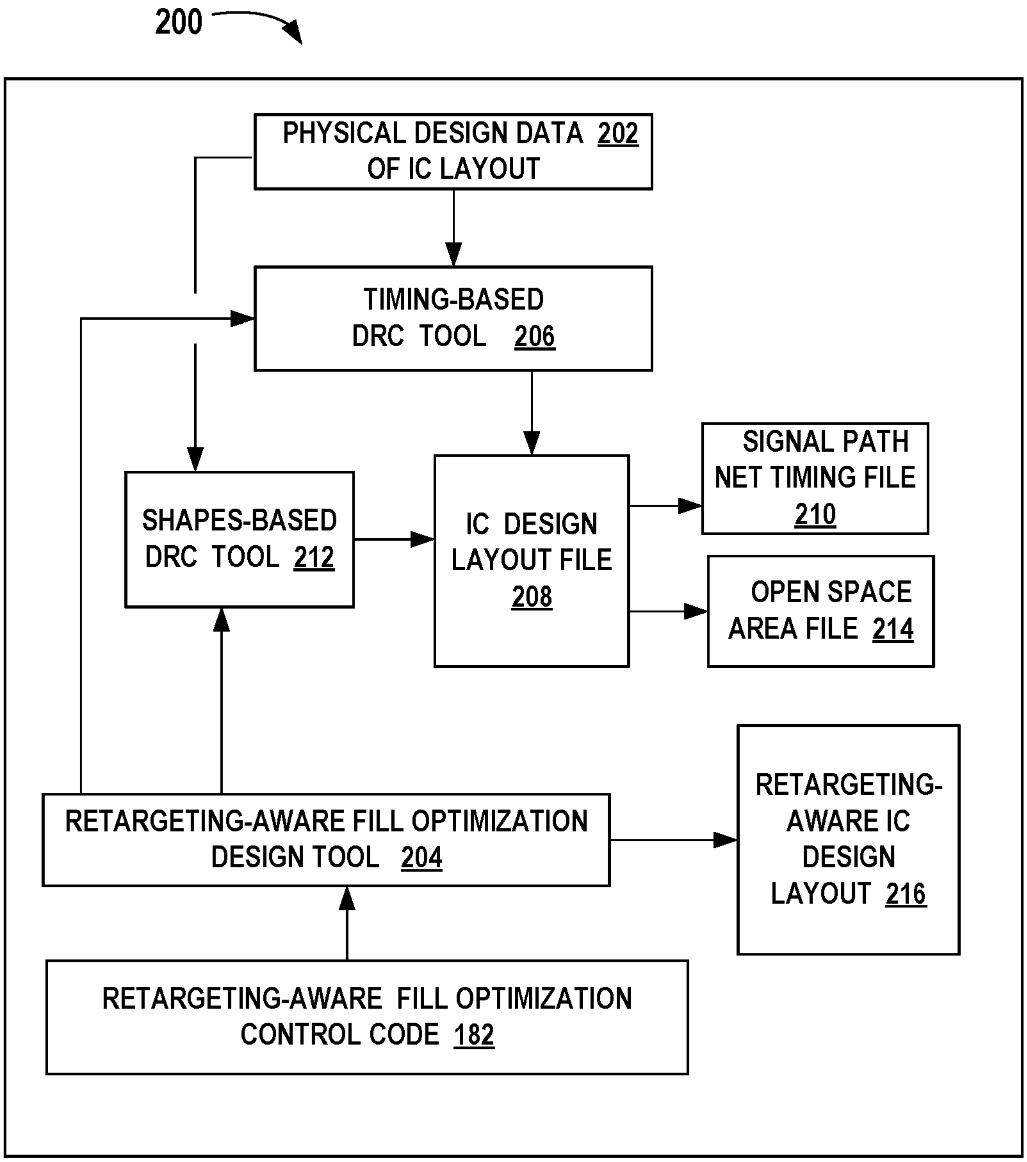
FIG. 2 is a schematic and block diagram of an example system for implementing retargeting-aware metal fill optimization for an IC layout, according to one or more disclosed embodiments.

FIG. 2 illustrates an example system 200 for implementing retargeting-aware metal fill optimization for an IC layout, according to one or more disclosed embodiments. System 200 can be used in conjunction with the computer 101 and cloud environment of the computing environment 100 of FIG. 1 with the Retargeting-Aware Fill Optimization Control Code 182 for implementing methods according to one or more embodiments.

System 200 performs disclosed methods for optimally providing retargeting-aware metal fill shapes, which are inserted into available empty space to avoid performance issues for the chip, that otherwise could result from foundry retargeting operations. Retargeting operations by a foundry that create larger active wires (i.e., signal path nets) may cause additional capacitance (e.g., planar capacitance and vertical capacitance) that affects the signal nets and logic shapes, resulting in timing performance issues for the chip. System 200 performs disclosed methods to pre-empt such adverse timing issues by purposefully inserting metal fill into gaps that could otherwise be used for foundry retargeting operations. The insertion of these extra fill shapes may improve timing by, for example, trading off small increases in planar capacitance to the neighboring signal wires for significantly reduced vertical capacitance between the neighboring signal wires and any wires crossing above or below those signal wires.

System 200 includes physical design data 202 of an IC layout for a given IC or chip to be manufactured, which is used to implement retargeting-aware metal fill optimization in accordance with disclosed embodiments. For example, system 200 obtains the physical design data 202 that comprises active metal shapes of a metal shapes infrastructure forming signal path nets connecting active devices together. The physical design data 202 includes metal fill shapes of the metal shapes infrastructure provided with the active metal shapes to satisfy density requirements for the IC layout. For example, the predefined active metal and metal fill shapes include rectangles or rectilinear polygons, (although other predefined shapes may be used) which represent active metal and metal fill wiring regions to be manufactured on different metal layers of the IC layout.

System 200 includes a Retargeting-Aware Fill Optimization Design Tool 204 used with the Retargeting-Aware Fill Optimization Control Code 182 for implementing disclosed methods. System 200 includes a timing-based Design Rule Checking (DRC) tool 206 comprising computer code, which inspects active metal shapes of the metal shapes infrastructure forming signal path nets connecting active devices of the physical design data 202 and performs timing-based checking of signal path nets. The timing-based DRC tool 206 can ensure the net timing characteristics of signal path nets meet IC design manufacturing requirements and will not result in a chip failure. An illustrated IC Design Layout File 208 includes initial physical design data 202 and signal path timing characteristic data used to implement retargeting-aware metal fill optimization of disclosed embodiments. The Retargeting-Aware Fill Optimization Design Tool 204 controls the timing-based DRC tool 206, which identifies signal path timing characteristics of the active metal shapes that form the signal path nets of the IC design, indicated at Signal Path Net Timing File 210.

The Retargeting-Aware Fill Optimization Design Tool 204 controls a shapes-based DRC tool 212, which uses IC Design Layout File 208 for performing shape-based checking of the physical design data 202, based on the active metal shapes, to identify one or more areas of open space adjacent to the active metal shapes of one or more signal path nets. The shapes-based DRC tool 212 identifies one or more open space areas adjacent to the active metal shapes of signal path nets based on the IC design layout file 208, indicated at Open Space Areas File 214. The Retargeting-Aware Fill Optimization Design Tool 204 generates a retargeting-aware IC design layout 216 including optimized retargeting-aware metal fill of disclosed embodiments to provide to a foundry for chip fabrication.

FIGS. 3, 4, 5, and 6 illustrate example operations of respective methods 300, 400, 500, and 600 for implementing retargeting-aware metal fill optimization for an IC layout provided to a foundry for chip fabrication, according to one or more disclosed embodiments. For example, the disclosed methods are implemented by system 200 including the Retargeting-Aware Fill Optimization Control Code 182 used with the computer 101 in accordance with one or more disclosed embodiments. In FIGS. 3, 4, 5, and 6, the same reference numbers are used for identical or similar components as used in FIG. 2.

Figure 3:
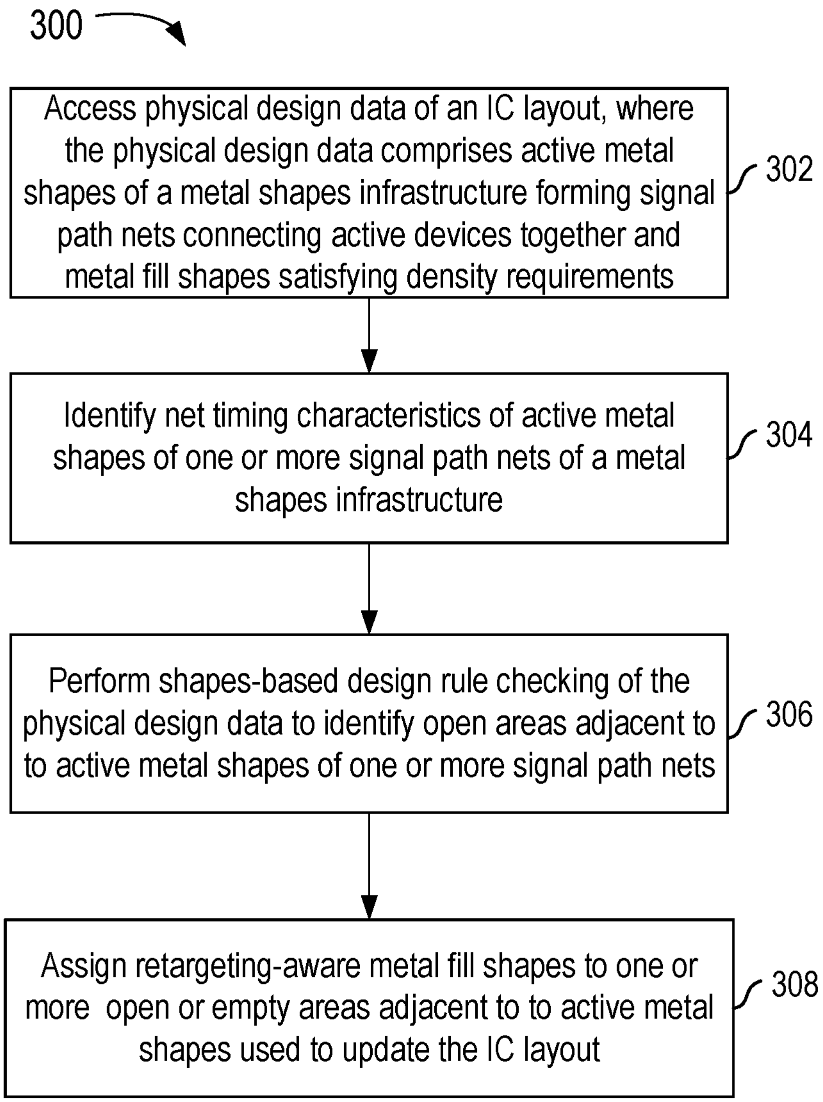
FIG. 3 is a flowchart illustrating example operations of a method for implementing retargeting-aware metal fill optimization for an IC layout, according to one or more disclosed embodiments.

Referring to FIG. 3, operations of method 300 begin at block 302 where system 200 accesses physical design data of an IC layout for an IC or chip to be manufactured, such as physical design data 202 comprising active metal shapes of a metal shapes infrastructure forming signal path nets connecting active devices together, that form a chip metallization or metal shapes infrastructure comprising multiple metal layers of the IC layout. At block 304, system 200 identifies timing characteristics of active metal shapes of one or more signal path nets. In an embodiment, the timing-based DRC tool 206 performs timing-based design rules checking of the physical design data 202 to identify timing characteristics of signal path nets, for example, identifying timing characteristics of the active metal shapes of signal path nets of the metal shapes infrastructure. In one embodiment, system 200 sequentially processes tiles of the layers of the physical design data 202 with the timing-based DRC tool 206 to identify timing results of the signal paths At block 306, system 200 performs shape-based checking of the physical design data, based on the active metal shapes, to identify one or more areas of open space adjacent to the active metal shapes of one or more signal path nets. For example, system 200 performs shape-based checking to identify available empty or white space using the DRC tool 212, which uses the IC Design Layout File 208 for performing shape-based checking of the physical design data 202.

At block 308, system 200 assigns retargeting-aware metal fill shapes to areas of open or empty space adjacent to the active metal shapes of one or more signal path nets, which is used to update the IC layout to submit to a foundry for fabrication. For example, system 200 performs the retargeting-aware metal fill optimization indicated at block 308, as described in the illustrated method 400 of FIG. 4 or method 500 of FIG. 5.

Figure 4:
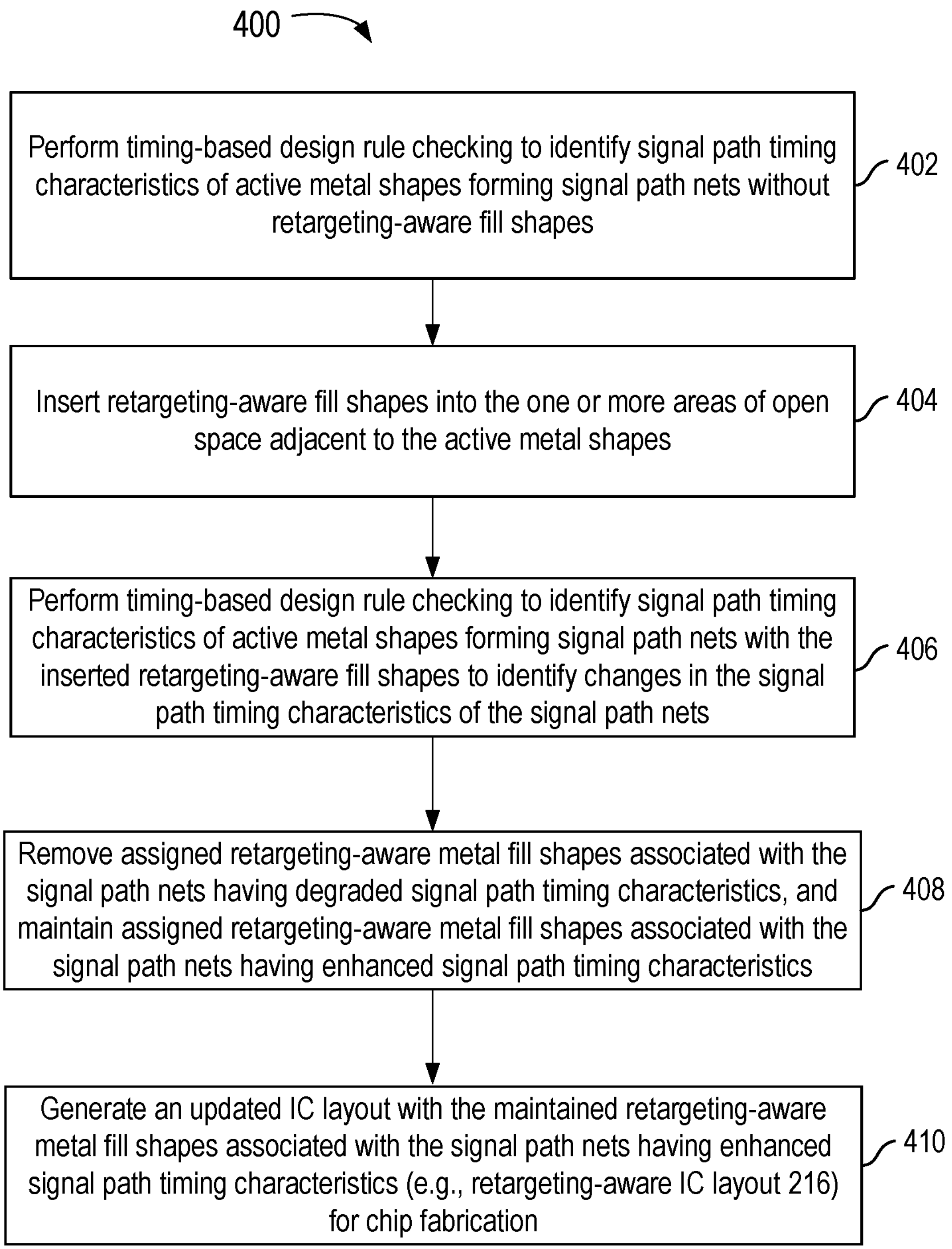
FIG. 4 is a flowchart illustrating example operations of another method for implementing retargeting-aware metal fill optimization for an IC layout, according to one or more disclosed embodiments.

Referring to FIG. 4, one embodiment of performing operations of block 308 illustrated by method 400 start at block 402, where system 200 performs timing-based design rule checking of the physical design data 202 to identify signal path timing characteristics of the active metal shapes forming the signal path nets without retargeting-aware metal fill shapes. At block 404, system 200 inserts retargeting-aware metal fill shapes into the one or more areas of open space adjacent to the active metal shapes. At block 406, system 200 performs timing-based design rule checking of the active metal shapes forming the signal path nets with the inserted retargeting-aware metal fill shapes to identify changes in the signal path timing characteristics of the signal path nets. At block 408, system 200 removes assigned retargeting-aware metal fill shapes for the signal path nets having degraded signal path timing characteristics, and maintains (i.e., inserts) the assigned retargeting-aware metal fill shapes associated with the signal path nets having enhanced signal path timing characteristics. At block 410, system 200 generates an updated IC layout with the inserted retargeting-aware metal fill shapes that prevent enlarging the active metal shapes of the one or more signal path nets to extend into the open space for chip fabrication. For example, the updated IC layout corresponds to the retargeting-aware IC design layout 216, which includes optimized retargeting-aware metal fill of disclosed embodiments, to provide to a foundry for chip fabrication.

Figure 5:
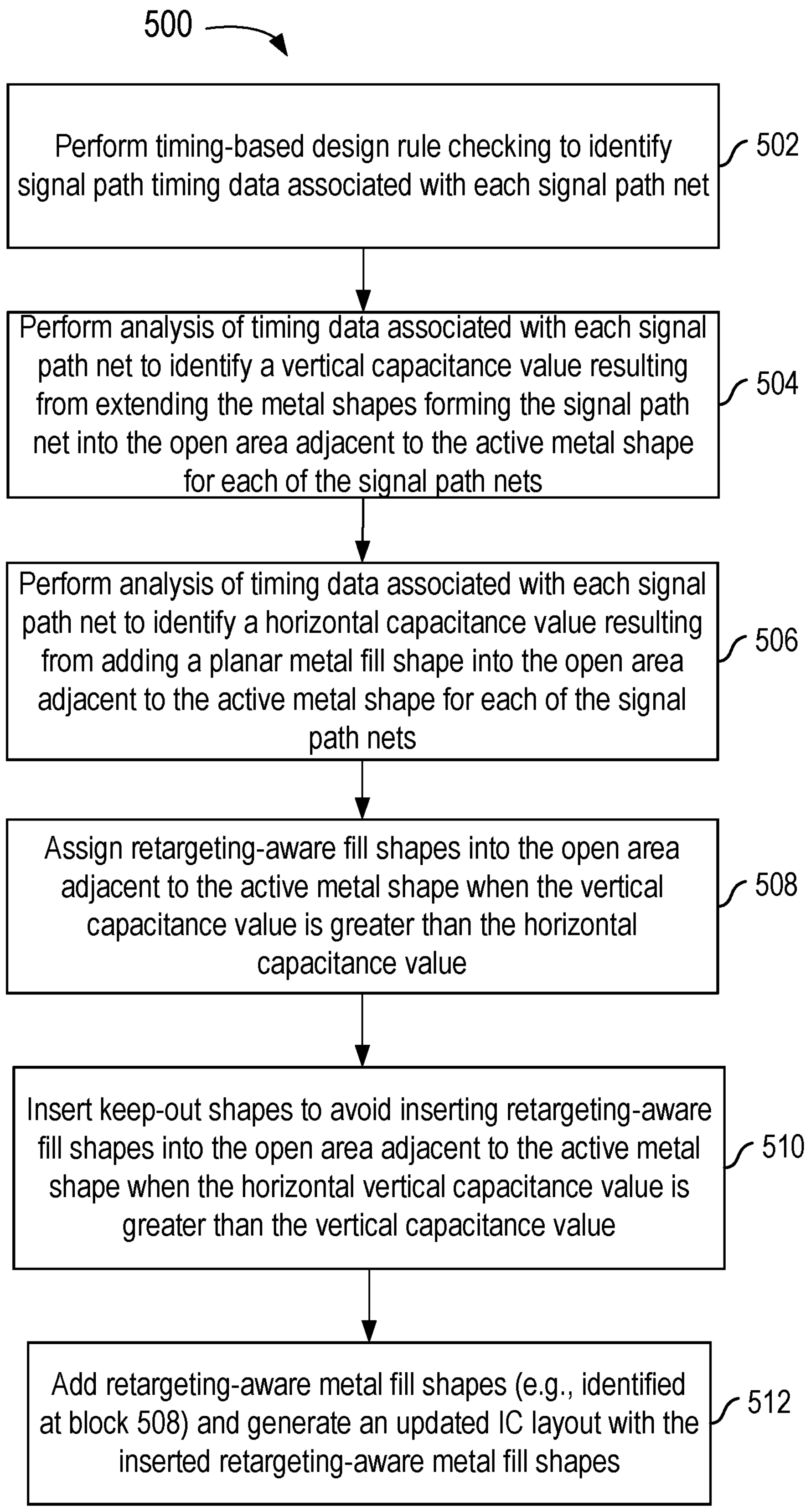
FIG. 5 is a flowchart illustrating example operations of another method for implementing retargeting-aware metal fill optimization for an IC layout, according to one or more disclosed embodiments.

Referring to FIG. 5, operations of method 500 for assigning retargeting-aware metal fill shapes begin at block 502, where system 200 performs timing-based design rule checking of the physical design data to identify timing data associated with each signal path net. At block 504, system 200 analyzes timing data associated with each signal path net to identify a vertical capacitance value resulting from extending the metal shapes forming the signal path net into the open space adjacent to the active metal shapes. At block 506, system 200 analyzes each of the signal path nets to identify a horizontal (or planar) capacitance value resulting from adding a planar metal fill shape into the open area adjacent to the active metal shapes for each of the signal path nets. In an embodiment, system 200 calculates a ratio of vertical path count/area per segment per layer, and sets a threshold to assign fill shapes, for example based on the calculated ratio and planar spacings between a wire edge and a neighboring wire edge. For example, 10 (ten) crossings/um means a retargeting value of 25 nm will increase vertical capacitance by a value X, while adding a planar fill shape will increase horizontal capacitance by a value Y, and retargeting-aware metal fill shapes are inserted if X>Y, while fill keep-outs are added if Y>X to ensure that density fill is not added into regions that would limit beneficial retargeting.

At block 508, system 200 assigns retargeting-aware metal fill shapes into the open area adjacent to the active metal shapes when the vertical capacitance value is greater than the horizontal capacitance value, according to one or more disclosed embodiments. At block 510, system 200 inserts keep-out shapes to avoid inserting retargeting-aware metal fill shapes into the open space adjacent to the active metal shapes when the horizontal capacitance impact is greater than the vertical capacitance impact. At block 510, system 200 adds retargeting-aware metal fill shapes into the open area adjacent to the active metal shapes when the vertical capacitance value is greater than the horizontal capacitance value (e.g., identified at block 508) and generates an updated IC layout with the inserted retargeting-aware metal fill shapes.

Figure 6:
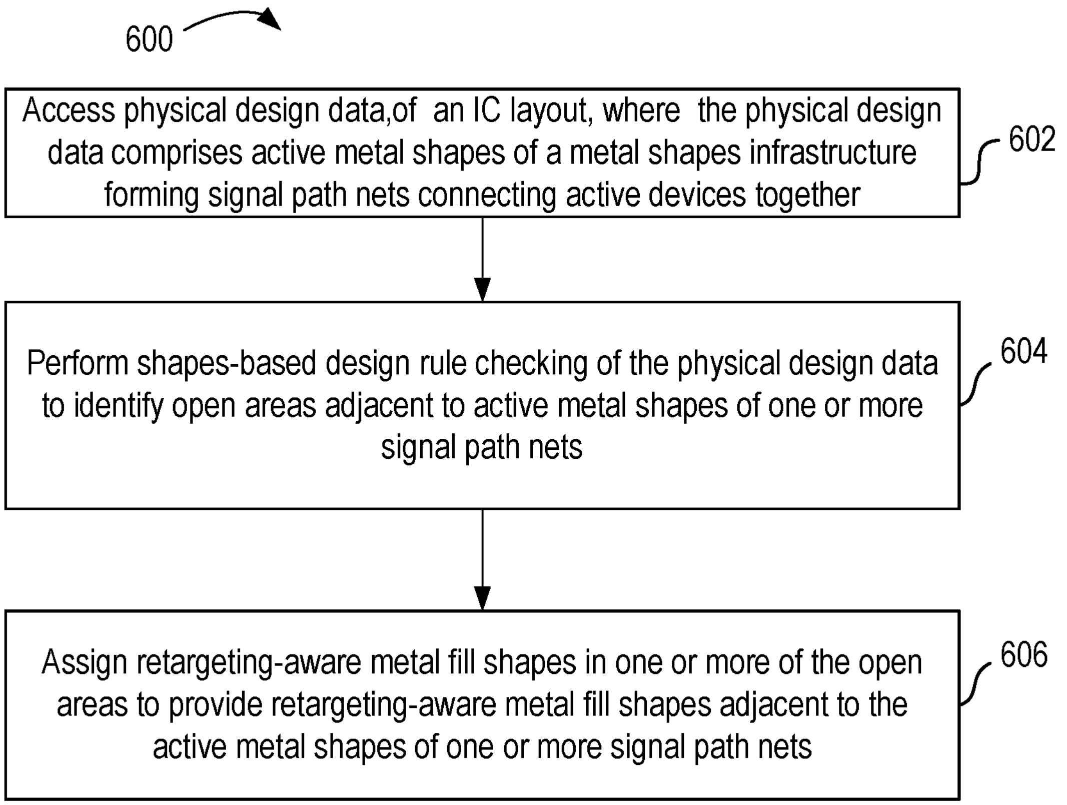
FIG. 6 is a flowchart illustrating a method for implementing intelligent retargeting-aware metal fill optimization of a disclosed embodiment.

FIG. 6 illustrates features and operations of method 600 for implementing retargeting-aware metal fill optimization of a disclosed embodiment. At block 602, system 200 accesses an IC layout comprising physical design data, the physical design data includes active metal shapes of a metal shapes infrastructure forming signal path nets connecting active devices together.

At block 604, system 200 performs shape-based checking of the physical design data, based on the active metal shapes, to identify one or more areas of open space adjacent to the active metal shapes of one or more signal path nets. In an embodiment, system 200 identifies areas of open empty space or white space adjacent to signal path nets, which could be used for retargeting operations by a foundry, to pre-empt adverse timing performance impact from the retargeting operations.

At block 606, system 200 assigns retargeting-aware metal fill shapes in one or more areas of open space, to provide retargeting-aware metal fill shapes adjacent to the active metal shapes of one or more signal path nets. In an embodiment, the retargeting-aware metal fill shapes limit retargeting operations by a foundry for chip fabrication. For example, retargeting-aware metal fill shapes are assigned or inserted into available empty space to avoid performance issues for the chip, that otherwise could result from foundry retargeting operations. System 200 optimizes the assigning of retargeting-aware metal fill shapes to provide metal fill into open space areas or gaps to achieve effective timing performance characteristics of the signal path nets, and pre-empt adverse timing issues that could otherwise result from foundry retargeting operations.

While the foregoing is directed to embodiments of the present invention, other and further embodiments of the invention may be devised without departing from the basic scope thereof, and the scope thereof is determined by the claims that follow.

What is claimed is:

1. A method comprising:

accessing an IC layout comprising physical design data, the physical design data comprising active metal shapes of a metal shapes infrastructure forming signal path nets connecting active devices together;

performing shape-based checking of the physical design data, based on the active metal shapes, to identify one or more areas of open space adjacent to the active metal shapes of one or more signal path nets; and assigning retargeting-aware metal fill shapes in one or more areas of open space, to provide retargeting-aware metal fill shapes adjacent to the active metal shapes of one or more signal path nets.

2. The method of claim 1, further comprising performing timing-based design rule checking of the physical design data to identify timing characteristics of the signal path nets.

3. The method of claim 2, wherein assigning retargeting-aware metal fill shapes is based on the timing characteristics of the signal path nets.

4. The method of claim 1, wherein the assigned retargeting-aware metal fill shapes adjacent to the active metal shapes of one or more signal path nets prevent enlarging the active metal shapes of the one or more signal path nets to extend into the open space for chip fabrication.

5. The method of claim 1, wherein assigning retargeting-aware metal fill shapes further comprises:

performing timing-based design rule checking to identify signal path timing characteristics of the active metal shapes forming the signal path nets without retargeting-aware metal fill shapes;

inserting retargeting-aware metal fill shapes into the one or more areas of open space adjacent to the active metal shapes; and performing timing-based design rule checking of the metal shapes forming the signal path nets with the retargeting-aware metal fill shapes to identify changes in the signal path timing characteristics of the signal path nets.

6. The method of claim 5, further comprising:

removing assigned retargeting-aware metal fill shapes for the signal path nets having degraded signal path timing characteristics; and maintaining the assigned retargeting-aware metal fill shapes of the signal path nets having enhanced signal path timing characteristics.

7. The method of claim 1, wherein assigning retargeting-aware metal fill shapes further comprises:

performing timing-based design rule checking of the physical design data to identify timing data associated with each signal path net; and analyzing timing data associated with each signal path net to identify a vertical capacitance value resulting from extending the metal shapes forming the signal path net into the open space adjacent to the active metal shapes.

8. The method of claim 7, further comprising analyzing each of the signal path nets to identify a horizontal capacitance value resulting from adding a planar metal fill shape into the open space adjacent to the active metal shapes for each of the signal path nets.

9. The method of claim 8, further comprising assigning retargeting-aware metal fill shapes to insert retargeting-aware metal fill shapes into the open space adjacent to the active metal shapes when the vertical capacitance value is greater than the horizontal capacitance value.

10. The method of claim 8, further comprising inserting keep-out shapes to avoid inserting retargeting-aware metal fill shapes into the open space adjacent to the active metal shapes when the horizontal capacitance value is greater than the vertical capacitance value.

11. A system, comprising one or more computer processors; and a memory containing a program which when executed by the one or more computer processors performs an operation, the operation comprising:

accessing an IC layout comprising physical design data, the physical design data comprising active metal shapes of a metal shapes infrastructure forming signal path nets connecting active devices together;

performing shape-based checking of the physical design data, based on the active metal shapes, to identify one or more one or more areas of open space adjacent to the active metal shapes of one or more signal path nets; and assigning retargeting-aware metal fill shapes in one or more areas of open space, to provide retargeting-aware metal fill shapes adjacent to the active metal shapes of one or more signal path nets.

12. The system of claim 11, further comprising performing timing-based design rule checking of the physical design data to identify timing characteristics of the signal path nets.

13. The system of claim 12, wherein assigning retargeting-aware metal fill shapes is based on the timing characteristics of the signal path nets.

14. The system of claim 11, wherein assigning retargeting-aware metal fill shapes further comprises:

performing timing-based design rule checking to identify signal path timing characteristics of the active metal shapes forming the signal path nets without retargeting-aware metal fill shapes;

inserting retargeting-aware metal fill shapes into the one or more one or more areas of open space adjacent to the active metal shapes; and performing timing-based design rule checking of the metal shapes forming the signal path nets with the retargeting-aware metal fill shapes to identify changes in the signal path timing characteristics of the signal path nets.

15. The system of claim 11, wherein assigning retargeting-aware metal fill shapes further comprises:

performing timing-based design rule checking of the physical design data to identify timing data associated with each signal path net;

analyzing timing data associated with each signal path net to identify a vertical capacitance value resulting from extending the metal shapes forming the signal path net into the open space adjacent to the active metal shapes; and analyzing each of the signal path nets to identify a horizontal capacitance value resulting from adding a planar metal fill shape into the open space adjacent to the active metal shapes for each of the signal path nets.

16. A computer program product comprising a computer-readable storage medium having computer-readable program code embodied therewith, the computer-readable program code executable by one or more computer processors to perform an operation comprising:

accessing an IC layout comprising physical design data, the physical design data comprising active metal shapes of a metal shapes infrastructure forming signal path nets connecting active devices together;

performing shape-based checking of the physical design data, based on the active metal shapes, to identify one or more areas of open space adjacent to the active metal shapes of one or more signal path nets; and assigning retargeting-aware metal fill shapes in one or more areas of open space, to provide retargeting-aware metal fill shapes adjacent to the active metal shapes of one or more signal path nets.

17. The computer program product of claim 16, further comprising performing timing-based design rule checking of the physical design data to identify timing characteristics of the signal path nets.

18. The computer program product of claim 17, wherein assigning retargeting-aware metal fill shapes is based on the timing characteristics of the signal path nets.

19. The computer program product of claim 16, wherein assigning retargeting-aware metal fill shapes further comprises:

performing timing-based design rule checking to identify signal path timing characteristics of the active metal shapes forming the signal path nets without retargeting-aware metal fill shapes;

inserting retargeting-aware metal fill shapes into the one or more areas of open space adjacent to the active metal shapes; and performing timing-based design rule checking of the metal shapes forming the signal path nets with the retargeting-aware metal fill shapes to identify changes in the signal path timing characteristics of the signal path nets.

20. The computer program product of claim 16, wherein assigning retargeting-aware metal fill shapes further comprises;

performing timing-based design rule checking of the physical design data to identify timing data associated with each signal path net; analyzing timing data associated with each signal path net to identify a vertical capacitance value resulting from extending the metal shapes forming the signal path net into the open space adjacent to the active metal shapes; and analyzing each of the signal path nets to identify a horizontal capacitance value resulting from adding a planar metal fill shape into the open space adjacent to the active metal shapes for each of the signal path nets.

* * * * *